UNITED STATES PATENT OFFICE.

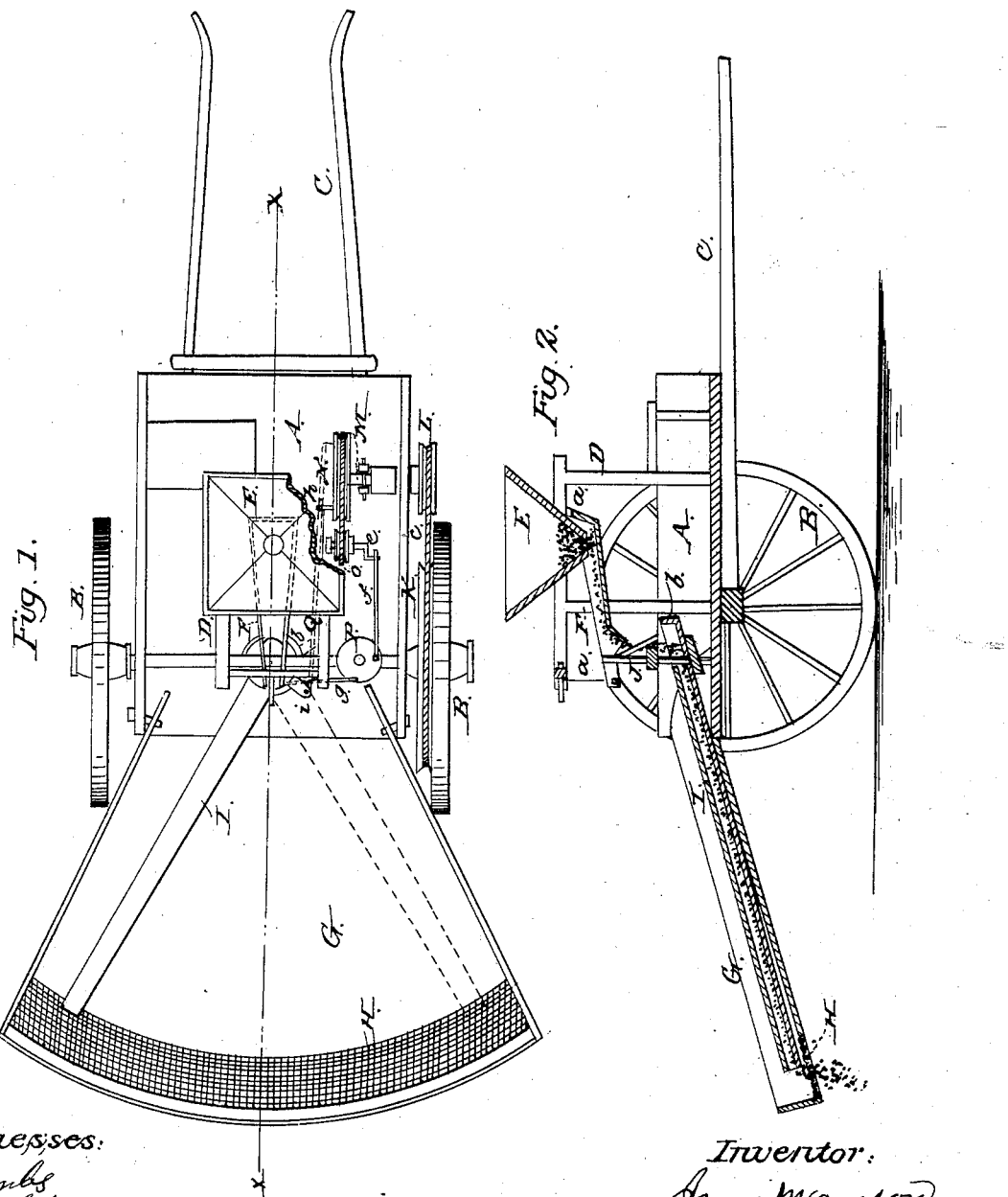

JAMES MORRISON, OF CLINTON, MAINE.

IMPROVEMENT IN SEEDING-MACHINES.

Specification forming part of Letters Patent No. 30,749, dated November 27, 1860.

*To all whom it may concern:*

Be it known that I, JAMES MORRISON, of Clinton, in the county of Kennebec and State of Maine, have invented a new and Improved Seeding-Machine; and I do hereby declare that the following is a full, clear, and exact description of the same, reference being had to the accompanying drawings, making a part of this specification, in which—

Figure 1 is a plan or top view of my invention; Fig. 2, a side sectional view of the same, taken in the line $x\ x$, Fig. 1.

Similar letters of reference indicate corresponding parts in the two figures.

This invention relates to an improvement in that class of seeding-machines in which the seed is sown broadcast. The invention consists in the employment or use of a vibrating spout or trough, a stationary screen, a hopper, and a shoe, arranged substantially as hereinafter fully shown and described, whereby the desired work may be performed in a very efficient manner.

To enable those skilled in the art to fully understand and construct my invention, I will proceed to describe it.

A represents a body or box, which is mounted on two wheels, B B', and is provided with thills C, arranged in the usual or in any proper way. On the body or box A there is placed a frame, D, which supports a hopper, E; and F is a shoe, which is suspended in the frame D by shafts $a$ immediately below the hopper, as shown in Fig. 2.

To the back part of the box A there is attached an inclined box, G, the lower end of which is of curved form, as shown in Fig. 1. The lower and back part of the box G has a screen, H, in it of a suitable width, said screen conforming to the curvature of the back part of the box G.

I represents a trough or spout, the front end of which is fitted on a vertical shaft, J, in the box A, and allowed to work freely thereon. The front part of the trough or spout I terminates in a circular hopper, $b$, which is directly beneath the back end of the shoe F. The trough or spout I extends down over the front edge of the screen H.

To the inner side of the wheel B' there is attached a pulley, K, around which a cord, $c$, passes, said cord also passing around a pulley, L, on a shaft, M, on the box A. On the inner end of shaft M there is placed a pulley, N, around which there passes a cord, $d$, said cord also passing around a pulley, O, the axis of which has a crank, $e$, attached. This crank $e$ has a pitman, $f$, connected to it, which pitman gives motion to a crank-pulley, P, the latter in turn giving, by means of a pitman, $g$, a shake motion to the shoe F.

The pulley N has a wrist-pin, $h$, attached to it near its periphery, and Q is a connecting-rod, one end of which is attached to the pin $h$ and the other to an arm, $i$, which projects from the side of the upper part of the trough or spout I, as shown in Fig. 1.

The operation is as follows: The hopper E is supplied with the seed to be sown, and as the machine is drawn along the trough or spout is vibrated through the medium of the pulley N, connecting-rod Q, and arm $i$. The seed passes from hopper E down the shoe F into the front end of the trough or spout I, and out from the front end of said trough or box on the screen H, through which it drops on the ground in a broadcast manner and is very evenly distributed.

Having thus described my invention, what I claim as new, and desire to secure by Letters Patent, is—

The vibrating spout or trough I, stationary screen H, hopper E, and shoe F, arranged for joint operation, essentially as and for the purpose set forth.

JAMES MORRISON.

Witnesses:
 JOHN TOTMAN,
 J. A. MORRISON.